(12) United States Patent
Desai et al.

(10) Patent No.: US 10,395,268 B1
(45) Date of Patent: Aug. 27, 2019

(54) ELECTRONIC REBATE PROCESSING

(71) Applicants: Jaymeen A. Desai, West Hills, CA (US); Gary H. Chen, Simi Valley, CA (US); Patrick Law, Westlake Village, CA (US)

(72) Inventors: Jaymeen A. Desai, West Hills, CA (US); Gary H. Chen, Simi Valley, CA (US); Patrick Law, Westlake Village, CA (US)

(73) Assignee: Intuit Inc., Mountain View, CA (US)

( * ) Notice: Subject to any disclaimer, the term of this patent is extended or adjusted under 35 U.S.C. 154(b) by 601 days.

(21) Appl. No.: 13/756,002

(22) Filed: Jan. 31, 2013

(51) Int. Cl.
  *G06Q 30/00* (2012.01)
  *G06Q 30/02* (2012.01)

(52) U.S. Cl.
  CPC .................. *G06Q 30/0234* (2013.01)

(58) Field of Classification Search
  CPC .................................. G06Q 30/0234
  USPC ........................................ 705/14.34
  See application file for complete search history.

(56) References Cited

U.S. PATENT DOCUMENTS

| | | | |
|---|---|---|---|
| 8,255,523 B1 * | 8/2012 | Nikolic ................ | H04L 67/22 705/14.41 |
| 8,280,769 B2 * | 10/2012 | Walker et al. ............. | 705/14.34 |
| 8,401,904 B1 * | 3/2013 | Simakov ............ | G06Q 20/3572 705/16 |
| 8,489,452 B1 * | 7/2013 | Warner ............... | G06Q 30/0226 705/14.34 |
| 8,630,898 B1 * | 1/2014 | Knackstedt et al. ....... | 705/14.34 |
| 8,825,523 B2 * | 9/2014 | Gillenson ............... | G06Q 30/02 705/14.17 |
| 9,286,635 B2 * | 3/2016 | Lamba ............... | G06Q 20/3224 |
| 9,361,606 B2 * | 6/2016 | Hertel ................... | G06Q 20/02 |
| 2010/0250359 A1 * | 9/2010 | Gillenson et al. ......... | 705/14.25 |
| 2011/0153405 A1 * | 6/2011 | Chen et al. ............... | 705/14.34 |
| 2011/0225417 A1 * | 9/2011 | Maharajh ................ | G06F 21/10 713/150 |

OTHER PUBLICATIONS

Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*

(Continued)

*Primary Examiner* — Matthew T Sittner
*Assistant Examiner* — Michael I Ezewoko
(74) *Attorney, Agent, or Firm* — Ferguson Braswell Fraser Kubasta PC (57) ABSTRACT

A method to process a reward item. The method includes detecting, by a computer processor and from a networked application associated with a product, a user using the networked application to access a pre-determined service, wherein the detecting comprises receiving a product identifier of the product that is acquired by the user, determining, by the computer processor and in response to detecting the user accessing the pre-determined service, the reward item offered by a reward program associated with acquiring the product by the user, and facilitating, by the computer processor and in response to the determining, delivery of the reward item to the user.

15 Claims, 5 Drawing Sheets

(56) References Cited

OTHER PUBLICATIONS

Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*
Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Metaphors We Live by, Lakoff, University of Chicago Press, 1980, pp. ix-55.*
Frame Analysis, Goffman, Northeastern University Press, 1974, pp. 1-39, 301-344.*
Algorithms + Data Structures = Programs, 1976, pp. xii-55.*
Streetlights and Shadows, MIT Press, 2009, pp. 33-47.*
How Things Shape the Mind, Malfouris, MIT Press, 2013, pp. 57-149.*
Evocative Objects, Turkle, MIT Press, 2007, pp. 224-231.*
The future of the internet—and how to stop It, Yale University Press, 2008, Chapter(s) 1-9, [emphasis pp. 11-18].*
Shamans, Software, and Spleens, Boyle, First Harvard University Press, 1997, pp. 1-16; 119-184.*
Patent Failure, Bessen, Princeton University Press, 2008, pp. 73-214 [emphasis p. 85].*

\* cited by examiner

ELECTRONIC REBATE PROCESSING

SUMMARY

In general, in one aspect, the invention relates to a method to process a reward item. The method includes detecting, by a computer processor and from a networked application associated with a product, a user using the networked application to access a pre-determined service, wherein the detecting comprises receiving a product identifier of the product that is acquired by the user, determining, by the computer processor and in response to detecting the user accessing the pre-determined service, the reward item offered by a reward program associated with acquiring the product by the user, and facilitating, by the computer processor and in response to the determining, delivery of the reward item to the user.

In general, in one aspect, the invention relates to a system to process a reward program. The system includes a computer processor, an input module executing on the computer processor and configured to detect, from a networked application associated with a product, a user using the networked application to access a pre-determined activity, wherein the detecting comprises receiving a product identifier of the product that is acquired by the user, an analysis module executing on the computer processor and configured to determine, in response to detecting the user accessing the pre-determined service, a reward item offered by the reward program associated with acquiring the product by the user, an output module executing on the computer processor and configured to facilitate, in response to the determining, delivery of the reward item to the user, and a repository coupled to the computer processor and configured to store the product identifier, reward program information, and user information.

In general, in one aspect, the invention relates to a non-transitory computer readable medium storing instructions to process a reward program. The instructions, when executed by a computer processor, comprising functionality for detecting, from a networked application associated with a product, a user using the networked application to access a pre-determined service, wherein the detecting comprises receiving a product identifier of the product that is acquired by a user, determining, in response to detecting the user accessing the pre-determined service, the reward item offered by a reward program associated with acquiring the product by the user, and facilitating, in response to the determining, delivery of the reward item to the user.

Other aspects of the invention will be apparent from the following detailed description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention allow the user of a networked software application associated with a purchased product to receive a rebate or other reward associated with the purchased product electronically. In particular, the user is also the acquirer (e.g., purchaser) of the product. In one or more embodiments, the product is assigned a unique identifier (ID) that is sent to a reward processing computer system when a first (or any pre-determined time(s)) use of the product is detected by the networked software application. Accordingly, based on detection of the first use (or any pre-determined time(s)) of the product, the reward processing computer system processes the rebate or reward for delivery to the user.

Figure 1:
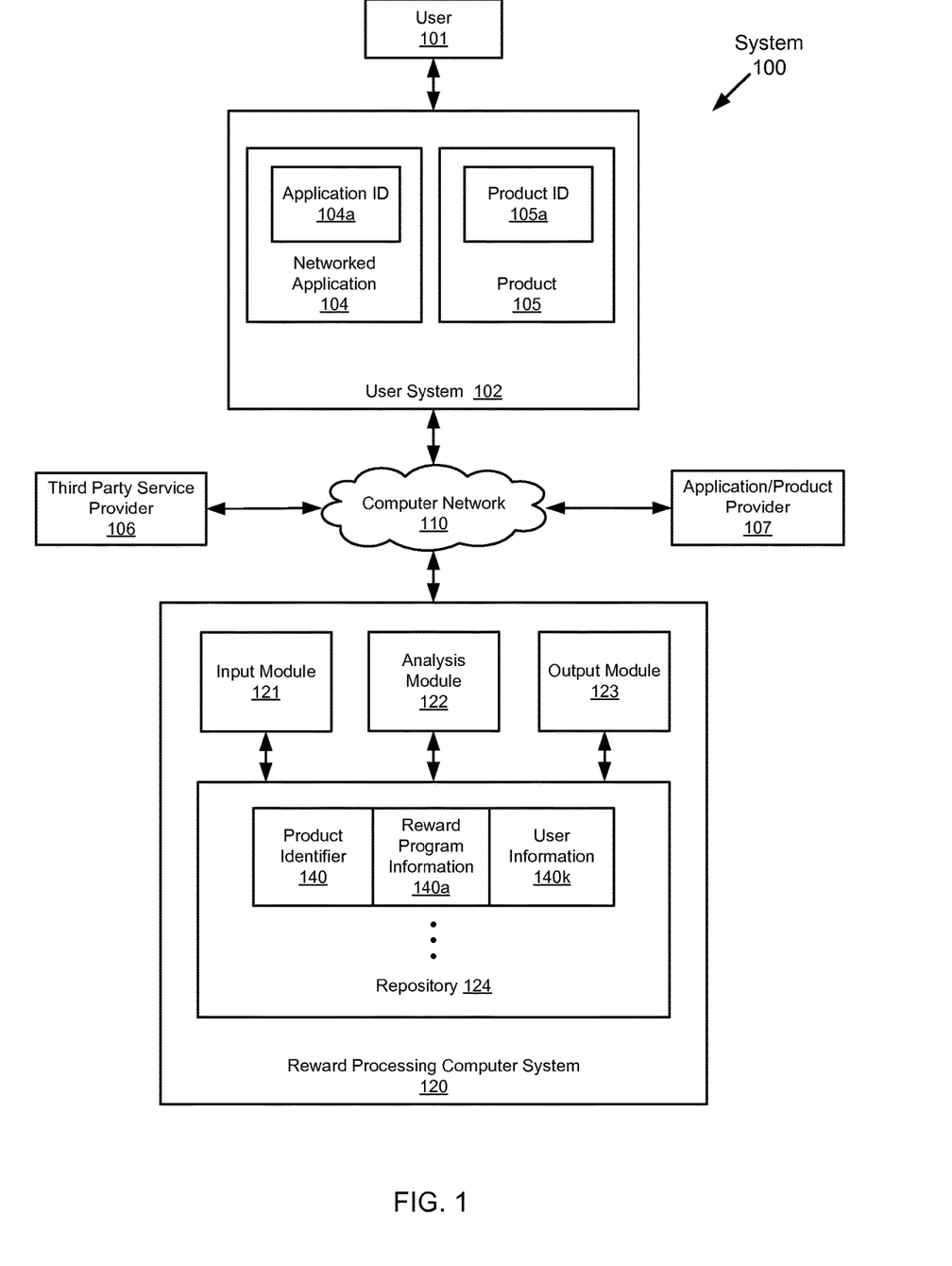
FIG. 1 shows a schematic diagram of a system for electronic rebate processing in accordance with one or more embodiments of the invention.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes a user system (102) having a networked application (104) and a product (105) that are identified by an application ID (104a) and a product ID (105a), respectively. For example, the application ID (104a) and/or product ID (105a) may be a serial number, a UPC number, or any other suitable machine readable identifier. The user (101) may be an individual, such as a consumer, a merchant, etc., who has acquired the product (105) and the networked application (104). In one or more embodiments, the product (105) is a device configured with computing and/or electronic communication capabilities. In one or more embodiments, the networked application (104) is installed and executing on the product (105). In one or more embodiments, the networked application (104) is installed and executing on a separate device (not shown) coupled to the product (105). In one or more embodiments, the networked application (104) and/or the product (105) is provided to the user (101) by the application/product provider (107). In one or more embodiments, the networked application (104) and/or the product (105) is used by the user (101) to access service(s) from the third party service provider (106).

Further as shown in FIG. 1, the system (100) includes a reward processing computer system (120) executing a reward processing software application that includes an input module (121), analysis module (122), and output module (123). In one or more embodiments, the reward processing software application is configured to process a reward for delivery to the user. For example, the reward may be offered to the user (101) to compensate for an expense (e.g., purchase price, shipping/handling fee, etc.) associated with acquiring the product (105) by the user (101). The reward may include a cash rebate, an account credit, a discount coupon, etc. that is offered by a reward program from the third party service provider (106) and/or the application/product provider (107). The application/product provider (107) may be a provider of the product (105) and/or a provider of the networked application (104). For example, application/product provider (107) may be a product manufacturer, a distributor, a retailer, a software distributor/vendor, etc.

The reward processing computer system (120) also includes a repository (124) storing information related to the reward processing, such as product identifier (ID) (140), reward program information (140a), user information (140k), etc. The repository (124) may include a disk drive storage device, a semiconductor storage device, other suitable computer data storage device, or combinations thereof. Various components of the system (100) are coupled via a computer network (110). For example, the computer network (110) may include wired and/or wireless portions of public and/or private data network, such as wide area networks (WANs), local area networks (LANs), Internet, etc.

In one or more embodiments, the product (105) is a payment device (e.g., a smartcard reader or a credit card swiper) used by the user (101) (e.g., a merchant) to capture a payment account identifier (e.g., smartcard or credit card account number) of a client of the user (101). The networked application (104) is a payment application used by the user (101) to collect a payment from the client based on the account identifier. The third party service provider (106) is a credit card processor providing payment collection service (i.e., credit card processing service) to the user (101). The computer network (110) includes a suitable portion of the credit card processing network. The payment application (i.e., networked application (104)) may be installed on the payment device (i.e., product (105)) or a separate user computing device (not shown) coupled to the payment device (i.e., product (105)).

In one or more embodiments, the product (105) is a media device (e.g., an Internet connected DVD player) that delivers a media program (e.g., music, movie, etc.) to the user (101) (e.g., an individual) via the computer network (110). The networked application (104) is a media application used by the user (101) to retrieve the media program from the third party service provider (106) (e.g., an Internet radio station, an on-demand movie subscription provider, etc.) via the computer network (110).

In one or more embodiments, the product (105) is a network-connected device, such as the aforementioned payment device, media device, or other device connected to the computer network (110). The networked application (104) is a registration application used by the user (101) to register the product (105) with the application/product provider (107) and/or registering with the third party service provider (106) to access a paid service.

In one or more embodiments, the reward processing computer system (120) includes the input module (121) that is configured to receive the reward program information (140a) from a provider (e.g., originator, sponsor, etc.) of the reward program. For example, the provider may be the application/product provider (107), the third party service provider (106), or a separate manufacturer (not shown) of the product (105). In one or more embodiments, the reward program information (140a) is received when the provider of the reward program subscribes to the reward program processing service. In particular, the reward program processing service may be provided by a reward processing service provider who operates the reward program processing computer system (120). In one or more embodiments, the reward program information (140a) includes qualifying criteria for determining eligibility of receiving the reward offered by the reward program. For example, the reward program information (140a) may include qualifying time period of acquiring the product (105), applicable sources of acquiring the product (105), expiration date of receiving the reward item, qualifying status of the user (101) to receive the reward item, etc.

In one or more embodiments, the input module (121) is further configured to detect that the user (101) is using the networked application (104) to access a pre-determined service associated with the product (105). In particular, the product ID (105a) is obtained by the input module (121) from the networked application (104) when the user access to the pre-determined service is detected. For example, the product ID (105a) may be received in a message sent to the reward processing computer system (120) by the networked application (104). Accordingly, the product ID (105a), or information representing the product ID (105a), is stored in the repository (124) as the product identifier (140). In one or more embodiments, the message includes both the product ID (105a) and the application ID (104a). Accordingly, the product identifier (140) also includes information related to the application ID (104a). In one or more embodiments, the message further includes information regarding the user (101), which is stored in the repository (124) as user information (140k). For example, the user information (140k) may include personal information (e.g., name, address, contact information, etc.) of the user (101), purchasing information (e.g., retail location, online order information, date of purchase, etc.) associated with acquiring the product (105) by the user (101), or other information relevant to eligibility for the reward program.

As noted above, in one or more embodiments, the user (101) uses the networked application (104), in conjunction with the product (105), to access a paid service (e.g., credit card processing service, on-demand media streaming service, etc.) from the third party service provider (106) via the computer network (110). In one or more embodiments, the pre-determined service includes registering the product (105) (e.g., the smartcard reader, credit card swiper, DVD player, media streaming player, etc.) with the third party service provider (106). For example, the networked application (104) may include registration functionality to allow the user (101) to register the product (105) with the third party service provider (106) remotely via the computer network (110). In one or more embodiments, the pre-determined service includes consuming the paid service for the very first time after acquiring the product (105) by the user (101). For example, the pre-determined service may be the first time the user (101) (e.g., a merchant) uses the smartcard reader or credit card swiper to process a client's payment. In another example, the pre-determined service may be the first time the user (101) (e.g., an individual consumer) uses the DVD player or media streaming player to play back a song or movie, or access a service installed on the player via an interface on the player. In one or more embodiments, the pre-determined service may include a combination or sequence of pre-determined activities, such as registering the product (105) and consuming the paid service for the very first time, consuming the paid service for the very first time prior to registering the product (105), consuming the paid service for the Nth time (N is an integer) regardless of the registration status, etc.

In one or more embodiments, the reward processing computer system (120) includes the analysis module (122) that is configured to determine a reward item (not shown), such as the aforementioned cash rebate, account credit, discount coupon, etc. In one or more embodiments, the reward item is offered by the reward program associated with acquiring the product (105) by the user (101). In one or more embodiments, the analysis module (122) determines the reward item in response to the input module (121) receiving the product ID (105*a*) from the networked application (104). For example, subsequent to receiving the product ID (105*a*), the input module (121) may pass the product identifier (140) (e.g., saved version of the product ID (105*a*)) to the analysis module (122) for determining the eligibility of the user (101) to receive the reward. In one or more embodiments, the eligibility is determined by comparing the product identifier (140) and the user information (140*k*) to qualifying criteria specified in the reward program information (140*a*). In one or more embodiments, multiple reward programs may have been set up in the reward processing computer system (120). In other words, multiple sets of reward program information may be stored in the repository (124). In one or more embodiments, the analysis module (122) is further configured to identify, from the multiple sets of reward program information based on the product identifier (140), the reward program information (140*a*) that is applicable to the product (105).

In one or more embodiments, the reward processing computer system (120) includes the output module (123) that is configured to facilitate delivery of the reward item to the user (101). For example, in response to the analysis module (122) determining eligibility, the output module (123) delivers the reward item to the user (101). In another example, in response to the analysis module (122) determining eligibility, the output module (123) generates a delivery instruction to deliver the reward item to the user (101). In one or more embodiments, the reward item (e.g., cash rebate, account credit, discount coupon, etc.) is delivered electronically to the user (101) via the computer network (102).

In one or more embodiments, the reward program is provided by a manufacturer of the product (105). The output module (123) is further configured to facilitate a marketing incentive payment by the manufacturer (i.e., the provider of the reward program) to the third party service provider (106) and/or the application/product provider (107) (e.g., a merchant selling the product (105) or a merchant selling the networked application (104)). For example, the output module (123) may generate and send a reward processing report to the manufacturer in response to the input module (121) receiving the product ID (105*a*) from the networked application (104), or in response to the analysis module (122) determining the eligibility. Accordingly, the manufacturer may send the marketing incentive payment to the third party service provider (106) and/or the application/product provider (107). In one or more embodiments, the operator of the reward processing computer system (120) provides the reward processing service to the provider of the reward program for a fee. Accordingly, the input module (121) is further configured to receive a notification when a fee payment is received from the provider of the reward program.

Figure 2A:
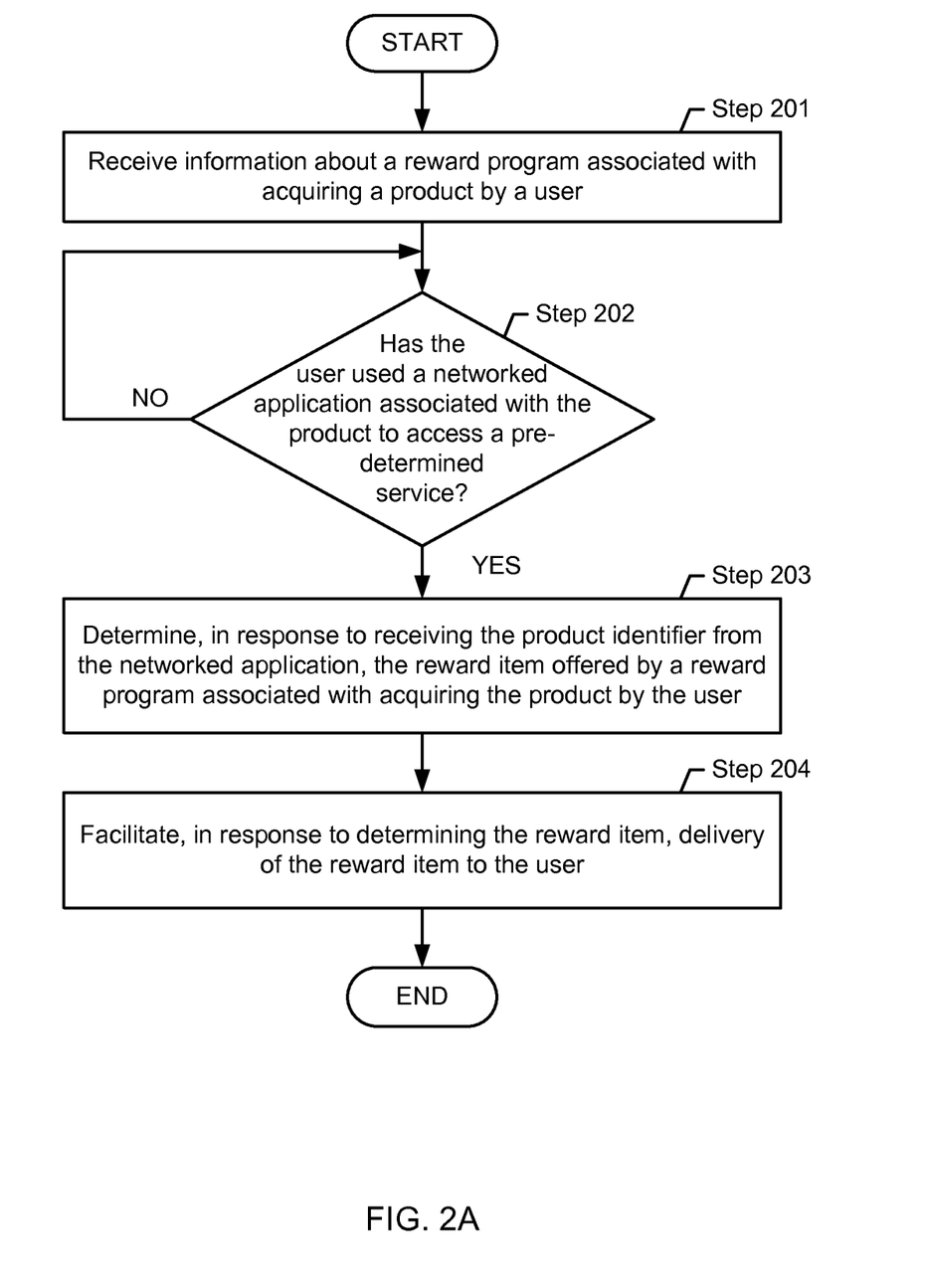
FIGS. 2A-2B show flowcharts of a method for electronic rebate processing in accordance with one or more embodiments of the invention.

FIG. 2A depicts a flowchart of a method in accordance with one or more embodiments of the invention. In one or more embodiments of the invention, one or more of the steps shown in FIG. 2A may be omitted, repeated, and/or performed in a different order. Accordingly, embodiments of the invention should not be considered limited to the specific arrangements of steps shown in FIG. 2A. In one or more embodiments, the method described in reference to FIG. 2A may be practiced using the system (100).

Initially in Step 201, reward program information is received by a reward processing computer system from a provider (e.g., originator, sponsor, etc.) of a reward program. The reward program is associated with acquiring (e.g., purchasing, leasing, etc.) a product by a user. For example, the product and an associated networked application may be acquired by the user from an application/product provider, such as a product manufacturer, a distributor, a retailer, a software distributor/vendor, etc. In one or more embodiments, the reward program information is received when the provider of the reward program subscribes to a reward program processing service. In particular, the reward program processing service may be provided by a reward processing service provider who operates the reward program processing computer system. In one or more embodiments, the reward program information includes qualifying criteria for determining eligibility of receiving the reward offered by the reward program. For example, the reward program information may include qualifying time period of acquiring the product, applicable sources of acquiring the product, expiration date of receiving the reward item, qualifying status of the user to receive the reward item, etc.

In Step 202, a decision is made as to whether a pre-determined service has been accessed by the user using a networked application associated with the product. If the determination is negative, i.e., the user has not yet accessed the pre-determined service using the networked application, the method remains in Step 202 to detect the user access to the pre-determined service using the networked application associated with the product. If the determination is positive, i.e., the user has accessed the pre-determined service using the networked application associated with the product, a product ID of the product is obtained by the reward processing computer system from the networked application and the method proceeds to Step 203. In one or more embodiments, the product ID is received while the networked application is used by the user to access the pre-determined service associated with the product. For example, the product ID may be received in a message sent to the reward processing computer system by the networked application. In one or more embodiments, the message includes both the product ID and an application ID of the networked application. In one or more embodiments, the message further includes information regarding the user. For example, the user information may include personal information (e.g., name, address, contact information, etc.) of the user, purchasing information (e.g., retail location, online order information, date of purchase, etc.) associated with acquiring the product by the user, or other information relevant to eligibility for the reward program.

In one or more embodiments, the user uses the networked application, in conjunction with the product, to access a paid service from a third party service provider via a computer network. In one or more embodiments, accessing the pre-determined service includes registering the product with the third party service provider. For example, the networked application may include registration functionality to allow the user to register the product with the third party service provider remotely via the computer network. In one or more embodiments, accessing the pre-determined service includes consuming the paid service for the very first time after acquiring the product by the user. In one or more embodiments, accessing the pre-determined service includes a combination or sequence of pre-determined activities, such as registering the product and consuming the paid service for the very first time, consuming the paid service for the very first time prior to registering the product, consuming the paid service for the Nth time (where N is an integer) regardless of the registration status, etc.

In Step 203, a reward item (e.g., cash rebate, account credit, discount coupon, etc.) is determined by the reward processing computer system. As noted above, the reward item is offered by the reward program associated with acquiring the product by the user. In one or more embodiments, the reward item is determined in response to receiving the product ID from the networked application. In particular, the product ID is used for determining eligibility of the user to receive the reward. In one or more embodiments, the eligibility is determined by comparing the product identifier and the user information to qualifying criteria specified in the reward program information. In one or more embodiments, multiple reward programs may have been set up in the reward processing computer system. In other words, multiple sets of reward program information may be stored in the reward processing computer system. In one or more embodiments, the reward program information that is applicable to the product is identified from the multiple sets of reward program information based on the product identifier.

In Step 204, delivery of the reward item to the user is facilitated. For example, in response to determining the eligibility, the reward item is delivered by the reward processing computer system to the user. In another example, in response to determining the eligibility, a delivery instruction is generated by the reward processing computer system to deliver the reward item to the user. In one or more embodiments, the reward item (e.g., cash rebate, account credit, discount coupon, etc.) is delivered electronically to the user via the computer network.

In one or more embodiments, the reward program is provided by a manufacturer of the product. A marketing incentive payment by the manufacturer (i.e., the provider of the reward program) to the third party service provider and/or the application/product provider (e.g., a merchant selling the product or a merchant selling the networked application) is facilitated by the reward processing computer system. For example, the reward processing computer system may generate and send a reward processing report to the manufacturer in response to receiving the product ID from the networked application, or in response to determining eligibility. Accordingly, the manufacturer may send the marketing incentive payment to the third party service provider and/or the application/product provider. In one or more embodiments, the operator of the reward processing computer system provides the reward processing service to the provider of the reward program for a fee. Accordingly, a notification of fee payment is received by the reward processing computer system from the provider of the reward program subsequent to processing the reward.

Figure 2B:
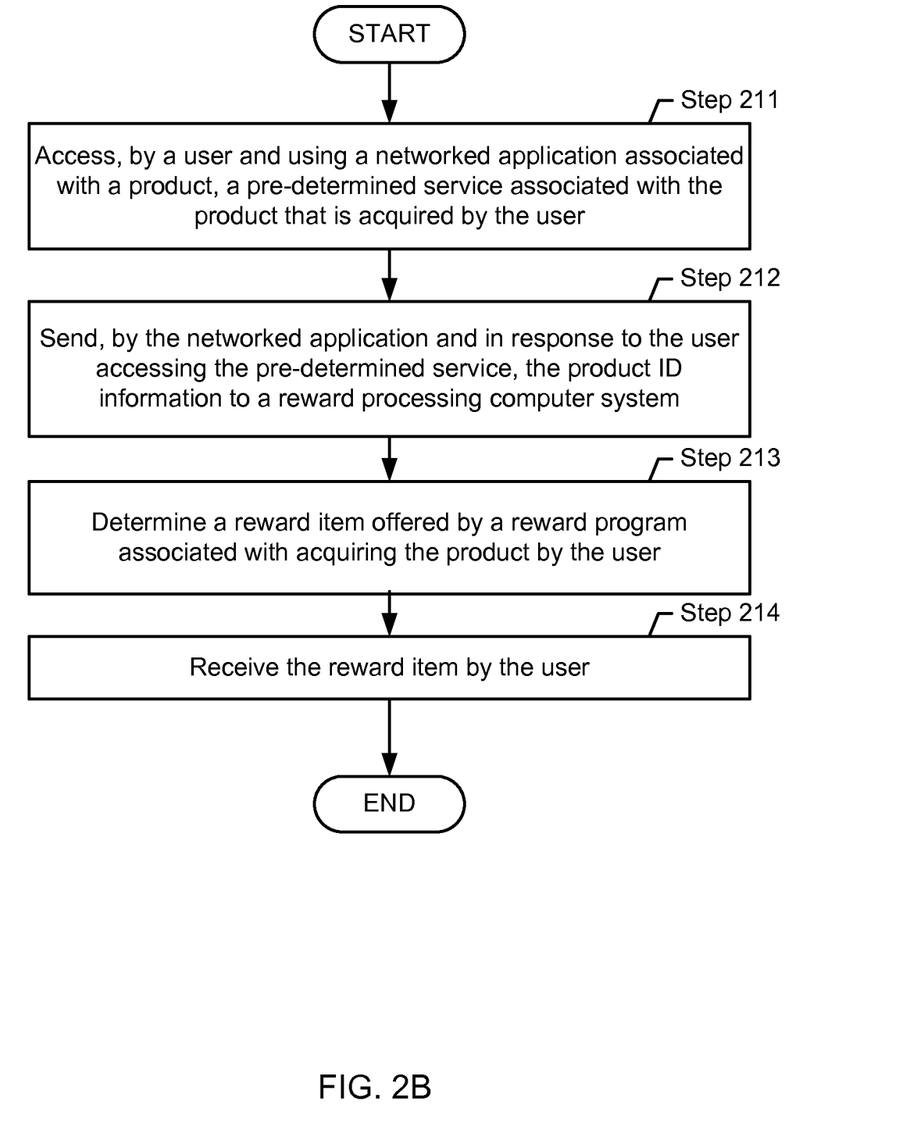

FIG. 2B depicts a flowchart of a method in accordance with one or more embodiments of the invention. In one or more embodiments of the invention, one or more of the steps shown in FIG. 2B may be omitted, repeated, and/or performed in a different order. Accordingly, embodiments of the invention should not be considered limited to the specific arrangements of steps shown in FIG. 2B. In one or more embodiments, the method described in reference to FIG. 2B may be practiced using the system (100). In particular, the flowchart shown in FIG. 2B is from a perspective of a user of the system (100).

Initially in Step 211, a user accesses a pre-determined service using a networked application associated with a product that is acquired by the user. As an incentive to acquiring the product, a reward item is offered by a reward program to compensate a portion of the expense associated with acquiring the product by the user. In one or more embodiments, the product is a network-connected device, such as the payment device or media device described in reference to FIG. 1 above, or other type of device connected to a computer network. In one or more embodiments, the networked application is a payment application used by the user to collect a payment from a client. The computer network is part of or associated with a credit card processing network. In one or more embodiments, the networked application is a media application used by the user to retrieve a media program from a third party service provider (e.g., an Internet radio station, an on-demand movie subscription provider, etc.) via the computer network. In one or more embodiments, the networked application is a registration application used by the user to register the product with an application/product provider and/or registering with a third party service provider to access a paid service (e.g., credit card payment collection service, Internet radio subscription, on-demand movie subscription, etc.) using the product. In one or more embodiments, accessing the pre-determined service includes consuming the paid service for the very first time after acquiring the product by the user. In one or more embodiments, accessing the pre-determined service includes a combination or sequence of pre-determined activities, such as registering the product and consuming the paid service for the very first time, consuming the paid service for the very first time prior to registering the product, consuming the paid service for the Nth time (N is an integer) regardless of the registration status, etc.

In Step 212, in response to the user accessing the pre-determined service, a product ID of the product is send by the networked application to a reward processing computer system. In one or more embodiments, the product ID is received while the networked application is used by the user to access the pre-determined service associated with the product. For example, the product ID may be received in a message sent to the reward processing computer system by the networked application. In one or more embodiments, the message includes both the product ID and an application ID of the networked application. In one or more embodiments, the message further includes information regarding the user. For example, the user information may include personal information (e.g., name, address, contact information, etc.) of the user, purchasing information (e.g., retail location, online order information, date of purchase, etc.) associated with acquiring the product by the user, or other information relevant to eligibility for the reward program.

In Step 213, a reward item (e.g., cash rebate, account credit, discount coupon, etc.) is determined by the reward processing computer system. As noted above, the reward item is offered by the reward program associated with acquiring the product by the user. In one or more embodiments, the reward item is determined in response to receiving the product ID from the networked application. In particular, the product ID is used for determining eligibility of the user to receive the reward. In one or more embodiments, the eligibility is determined by comparing the product identifier and the user information to qualifying criteria specified in the reward program information. In one or more embodiments, multiple reward programs may have been set up in the reward processing computer system. In other words, multiple sets of reward program information may be stored in the reward processing computer system. In one or more embodiments, the reward program information that is applicable to the product is identified from the multiple sets of reward program information based on the product identifier.

In Step 214, the reward item is received by the user. For example, in response to determining the eligibility, the reward item is delivered by the reward processing computer system to the user. In another example, in response to determining the eligibility, a delivery instruction is generated by the reward processing computer system to deliver the reward item to the user. In one or more embodiments, the reward item (e.g., cash rebate, account credit, discount coupon, etc.) is delivered electronically to the user via the computer network.

Figure 3A:
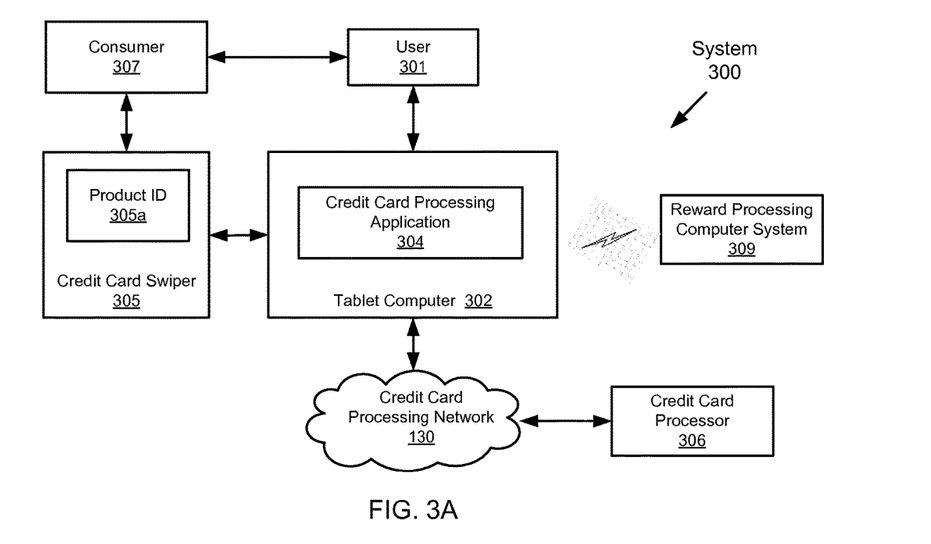
FIGS. 3A-3B show an example of electronic rebate processing in accordance with one or more embodiments of the invention.
Figure 3B:
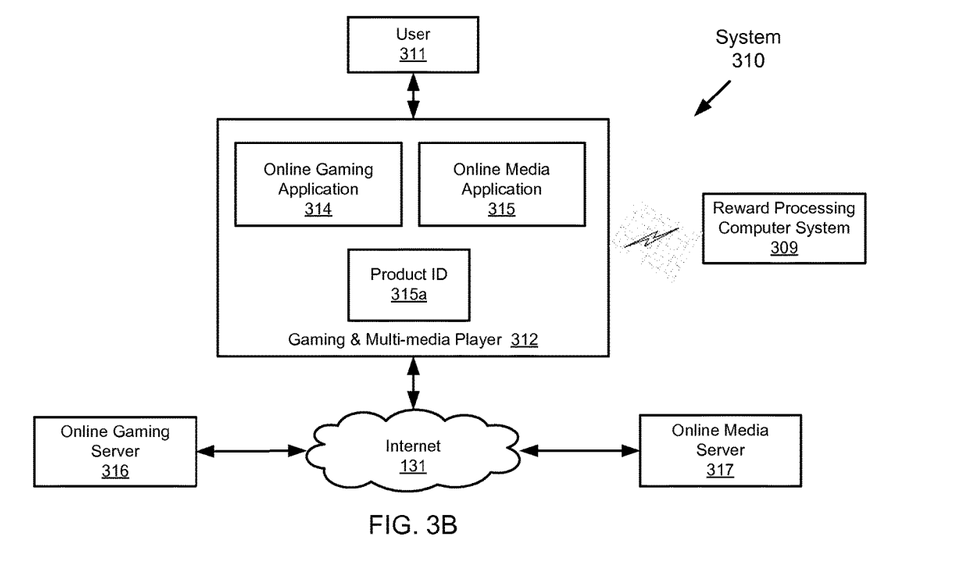

FIGS. 3A-3B show an application example in accordance with one or more embodiments of the invention. This application example may be practiced using the system (100) of FIG. 1 and based on the method described with respect to FIG. 2A above.

FIG. 3A shows a system (300) of processing a rebate to a merchant for subscribing to credit card processing service from a credit card processor. The rebate program may be provided by a manufacturer of the credit card swiper (305) or by the credit card processor (306). As shown in FIG. 3A, the user (301) (i.e., the merchant) receives the credit card swiper (305) from the credit card processor (306) as part of a starter package of the credit card processing service subscription. The user (301) connects the credit card swiper (305) to his/her tablet computer (302) on which the credit card processing application (304) is installed. The very first time the user (301) processes a credit card payment from the consumer (307) using the credit card swiper (305) and the credit card processing application (304) via the credit card processing network (130), the credit card processing application (304) retrieves and sends the product ID (305a) of the credit card swiper (305) and relevant user information of the user (301) to the reward processing computer system (309). The reward processing computer system (309) in turn processes the reward based on the product ID (305a), user information of the user (301), and applicable reward program information.

FIG. 3B shows a system (310) of processing a rebate to a consumer for subscribing to online gaming or media service from an online service provider. The rebate program may be provided by a manufacturer of the gaming and multi-media player (312), or by the online service provider operating the online gaming server (316) or the online media server (317). As shown in FIG. 3B, the user (311) (i.e., the consumer) purchases the gaming and multi-media player (312), which may be a computer dedicated to online gaming or an Internet-connected media player. For example, the gaming and multi-media player (312) may be pre-installed with the online gaming application (314) or the online media application (315). In another example, the user (311) installs the online gaming application (314) or the online media application (315) onto the gaming and multi-media player (312).

The very first time the user (311) accesses the online gaming server (316) via the Internet (131) to play an online game using the gaming and multi-media player (312) and the online gaming application (314), the online gaming application (314) retrieves and sends the product ID (315a) of the gaming and multi-media player (312) and relevant user information of the user (311) to the reward processing computer system (309). Similarly, the very first time the user (311) access the online media server (317) via the Internet (131) to play an on-demand movie using the gaming and multi-media player (312) and the online media application (315), the online media application (314) retrieves and sends the product ID (315a) of the gaming and multi-media player (312) and relevant user information of the user (311) to the reward processing computer system (309). Accordingly, the reward processing computer system (309) in turn processes the reward based on the product ID (315a), user information of the user (311), and applicable reward program information.

Figure 4:
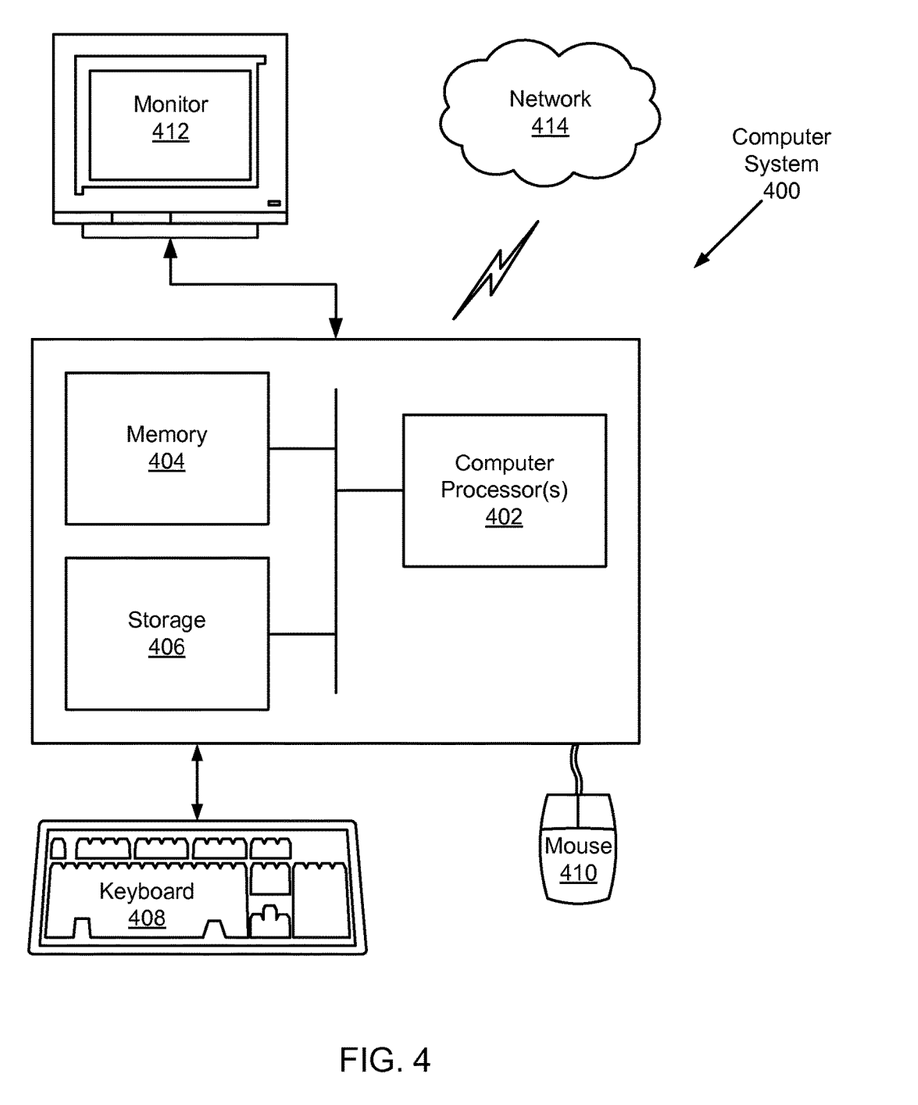
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more computer processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (414). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
 receiving a payment account identifier of a client of a user,
  wherein the payment account identifier is received by a computer from a card swiper,
  wherein the card swiper is configured to be connected to the computer, wherein the payment account identifier is captured by the card swiper for processing payment from the client via a payment collection service over a computer network;

determining, in response to receiving the payment account identifier of the client, that the capture of the payment account identifier of the client is a very first use of the card swiper by the user to process a payment using a payment application over the computer network;

retrieving, by the payment application from the card swiper, a product identifier of the card swiper; and transmitting the product identifier of the card swiper and information of the user to a remote computer system,
wherein the product identifier is transmitted by the computer with the payment application over the computer network,
wherein the product identifier is stored in a repository of the remote computer system,
wherein the product identifier and the information of the user are compared to qualifying criteria in an eligibility determination for a reward program by the remote computer system,
wherein the product identifier is transmitted to register the card swiper.

2. The method of claim 1,
wherein a reward item is offered to the user to compensate an expense associated with acquiring the card swiper, and
wherein the reward item comprises at least one selected from a group consisting of a cash rebate, an account credit, and a discount coupon.

3. The method of claim 2,
wherein the reward item is offered from at least one entity selected from a group consisting of: a manufacturer of the card swiper, and the payment collection.

4. The method of claim 1,
wherein processing the payment from the client includes using the payment collection service for the very first time after acquiring the card swiper.

5. The method of claim 1, wherein the payment collection service includes a credit card processing network.

6. A system, comprising:
a card swiper;
a computer; and
a payment application, which is networked and when executed on the computer performs operations as follows:
receive a payment account identifier of a client of a user of the payment application,
wherein the payment account identifier is received by the computer from the card swiper,
wherein the card swiper is configured to be connected to the computer,
wherein the payment account identifier is captured by the card swiper for processing payment from the client via a payment collection service over a computer network;
determine, in response to receiving the payment account identifier of the client, that the capture of the payment account identifier of the client is a very first use of the card swiper by the user to process a payment;
retrieve, by the payment application from the card swiper, a product identifier of the card swiper; and
transmit, over a network to a remote computer system, the product identifier of the card swiper and information of the user,
wherein the product identifier is transmitted by the computer with the payment application over the computer network,
wherein the product identifier is stored in a repository of the remote computer system,
wherein the product identifier and the information of the user are compared to qualifying criteria in an eligibility determination for a reward program by the remote computer system,
wherein the product identifier is transmitted to register the card swiper.

7. The system of claim 6,
wherein a reward item is offered to the user to compensate an expense associated with acquiring the card swiper, and
wherein the reward item comprises at least one selected from a group consisting of a cash rebate, an account credit, and a discount coupon.

8. The system of claim 7,
wherein the reward item is offered from at least one entity selected from a group consisting of: a manufacturer of the card swiper, and the payment collection service.

9. The system of claim 6,
wherein processing the payment from the client includes using the payment collection service for the very first time after acquiring the card swiper.

10. The system of claim 6, wherein the payment collection service includes a credit card processing network.

11. A non-transitory computer readable medium storing instructions the instructions, which when executed by a computer processor, perform operations as follows:
receiving a product identifier and information of a user,
wherein the product identifier is the product identifier of a card swiper configured to capture an account identifier of the client,
wherein the account identifier is received by a computer from the card swiper,
wherein the card swiper is configured to be connected to the computer,
wherein the product identifier and the information of the user are received from a payment application that operates on the computer,
wherein the payment application is networked and configured to collect a payment from a client of the user,
wherein the product identifier of the card swiper is received from the payment application in response to the payment application detecting a very first use of the card swiper by the user to process the payment,
wherein the product identifier is transmitted to register the card swiper, and
wherein the payment application is configured to access a payment collection service provided by a third party service provider;
storing the product identifier in a repository;
comparing the product identifier and the information of the user to qualifying criteria in an eligibility determination for a reward program by the remote computer system,
determining, in response to receiving the product identifier of the card swiper, an offer of the reward program, wherein the offer is associated with acquiring the card swiper by the user.

12. The non-transitory computer readable medium of claim 11,
   wherein the offer compensates an expense associated with the user acquiring the card swiper, and
   wherein the offer comprises at least one selected from a group consisting of a cash rebate, an account credit, and a discount coupon.

13. The non-transitory computer readable medium of claim 11,
   wherein the very first use of the card swiper by the user comprises accessing the payment collection service for the very first time after acquiring the card swiper.

14. The non-transitory computer readable medium of claim 13,
   wherein the payment collection service comprises a credit card processing service.

15. The non-transitory computer readable medium of claim 11, the instructions, when executed by the computer processor, perform operations as follows:
   facilitating, in response to receiving the product identifier of the card swiper from the payment application, a marketing incentive payment by one of: a manufacturer of the card swiper, and the payment collection service.

* * * * *